US008131080B2

(12) United States Patent
Tonouchi

(10) Patent No.: US 8,131,080 B2
(45) Date of Patent: Mar. 6, 2012

(54) HANDWRITING DETERMINATION APPARATUS AND METHOD AND PROGRAM

(75) Inventor: Yojiro Tonouchi, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 926 days.

(21) Appl. No.: 11/954,321

(22) Filed: Dec. 12, 2007

(65) Prior Publication Data

US 2008/0240568 A1 Oct. 2, 2008

(30) Foreign Application Priority Data

Mar. 29, 2007 (JP) .................................. 2007-087199

(51) Int. Cl.
*G06K 9/18* (2006.01)

(52) U.S. Cl. ........ 382/186; 382/187; 382/188; 382/202; 382/203; 382/119; 345/179; 345/173; 345/158; 345/180

(58) Field of Classification Search .................. 382/186, 382/187, 188, 202, 203, 230, 119; 345/179, 345/173, 158, 180
See application file for complete search history.

(56) References Cited

U.S. PATENT DOCUMENTS

| 7,013,046 | B2 * | 3/2006 | Kawamura et al. ........... 382/186 |
| 2005/0175242 | A1 * | 8/2005 | Tanaka .......................... 382/187 |
| 2006/0221064 | A1 * | 10/2006 | Sawada ......................... 345/173 |

FOREIGN PATENT DOCUMENTS

| JP | 6161652 | A | 6/1994 |
| JP | 8137609 | A | 5/1996 |
| JP | 2003-196593 | | 7/2003 |
| JP | 2003233452 | A | 8/2003 |

* cited by examiner

OTHER PUBLICATIONS

Official Action dated Mar. 24, 2009 for corresponding Japanese Application No. 2007-087199.

*Primary Examiner* — Mike Rahmjoo
(74) *Attorney, Agent, or Firm* — Ohlandt, Greeley, Ruggiero & Perle, LLP

(57) ABSTRACT

A handwriting apparatus includes unit acquiring first-handwriting data, unit storing one-stroke-handwriting data and a first command as an instruction, the instruction corresponding to the one-stroke-handwriting data and being executed with a device, unit, when the first-handwriting data corresponds to one stroke, searching the storage unit for the first command corresponding to the one-stroke-handwriting data corresponding to the one stroke, unit planning to execute the first command when the corresponding first command is searched out from the storage unit, unit storing one-stroke-handwriting data and a second command as an instruction which corresponds to the one-stroke-handwriting data, the second command being different from the first command, unit regarding the first-handwriting data as one-stroke-handwriting data at time intervals and search the storage unit for the second command corresponding to the one-stroke-handwriting data, and unit, when the corresponding second command is searched out from the storage unit, planning to execute the corresponding second command.

5 Claims, 11 Drawing Sheets

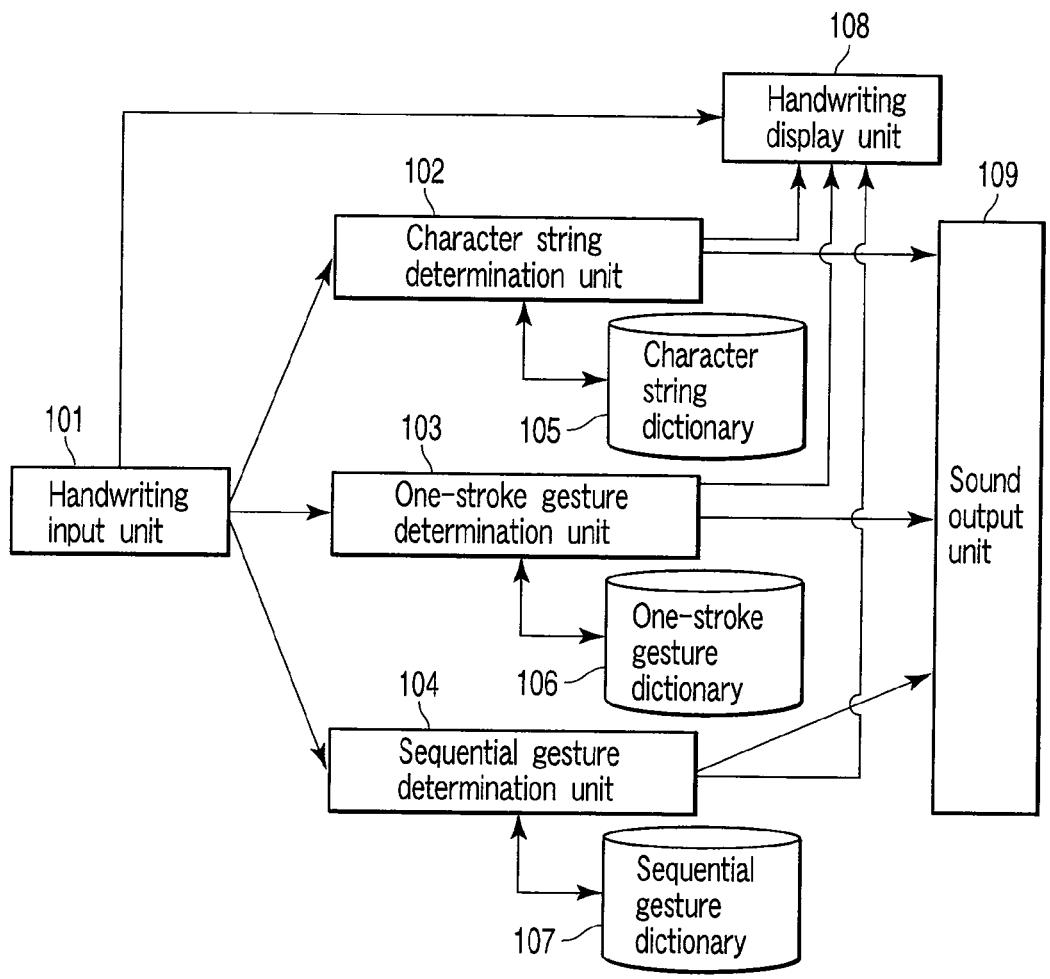
F I G. 1

HANDWRITING DETERMINATION APPARATUS AND METHOD AND PROGRAM

CROSS-REFERENCE TO RELATED APPLICATIONS

This application is based upon and claims the benefit of priority from prior Japanese Patent Application No. 2007-087199, filed Mar. 29, 2007, the entire contents of which are incorporated herein by reference.

BACKGROUND OF THE INVENTION

1. Field of the Invention

The present invention relates to a handwriting determination apparatus and method and a program which perform character string or gesture determination on the handwriting input to a coordinate input device such as a touch panel or a tablet.

2. Description of the Related Art

Conventionally, since gesture determination is performed per stroke, gesture determination processing starts after the end of handwriting input corresponding to one stroke (see, for example, JP-A 2003-196593 (KOKAI)).

A prior art performs character recognition processing or gesture determination processing on a stroke basis. For this reason, even if the user wants to continuously perform the same operation, e.g., cursor moving or scrolling, he/she needs to repeatedly input a gesture having the same shape. This complicates the input operation.

Although it is conceivable to use a method of expressing a moving distance by the size of a gesture, the prior art performs determination processing only after the writing of one stroke. It is not known how a gesture input actually reflects in operation, until the completion of one-stroke input. A determination error may lead to sudden execution of an operation which the user had not expected.

BRIEF SUMMARY OF THE INVENTION

In accordance with a first aspect of the invention, there is provided a handwriting determination apparatus comprising: an acquisition unit configured to acquire first handwriting data written by a user; a one stroke storage unit configured to store one stroke handwriting data and a first command as an instruction, the instruction corresponding to the one stroke handwriting data and being executed with a device to which the apparatus is connected; a one stroke search unit configured to, when the first handwriting data corresponds to one stroke, search the one stroke storage unit for the first command corresponding to the one stroke handwriting data corresponding to the one stroke; a one stroke planning unit configured to plan to execute the first command when the corresponding first command is searched out from the one stroke storage unit; a sequential storage unit configured to store one stroke handwriting data and a second command as an instruction which corresponds to the one stroke handwriting data, the second command being different from the first command; a regarding unit configured to, while the first handwriting data is being acquired, regard the first handwriting data as one stroke handwriting data at predetermined time intervals and search the sequential storage unit for the second command corresponding to the one stroke handwriting data; and a sequential planning unit configured to, when the corresponding second command is searched out from the sequential storage unit, plan to execute the corresponding second command.

In accordance with a second aspect of the invention, there is provided a handwriting determination apparatus comprising: an acquisition unit configured to acquire first handwriting data written by a user; a character string storage unit configured to store second handwriting data corresponding to not less than one stroke and a character string corresponding to the second handwriting data; a character string search unit configured to search the character string storage unit for a character string corresponding to the second handwriting data acquired so far when the first handwriting data corresponds to one stroke; an output planning unit configured to, when the corresponding character string is searched out from the character string storage unit, output the character string; a sequential storage unit configured to store one stroke handwriting data and a command which is made to correspond to the handwriting data; a sequential search unit configured to, while the first handwriting data is being acquired, regard the first handwriting data as one stroke handwriting data at predetermined time intervals and search the sequential storage unit for the command corresponding to the one stroke handwriting data; and a sequential planning unit configured to, when the corresponding command is searched out from the sequential storage unit, plan to execute the corresponding command.

BRIEF DESCRIPTION OF THE SEVERAL VIEWS OF THE DRAWING

FIG. 1 is a block diagram of a handwriting determination apparatus according to this embodiment;

DETAILED DESCRIPTION OF THE INVENTION

Figure 2:
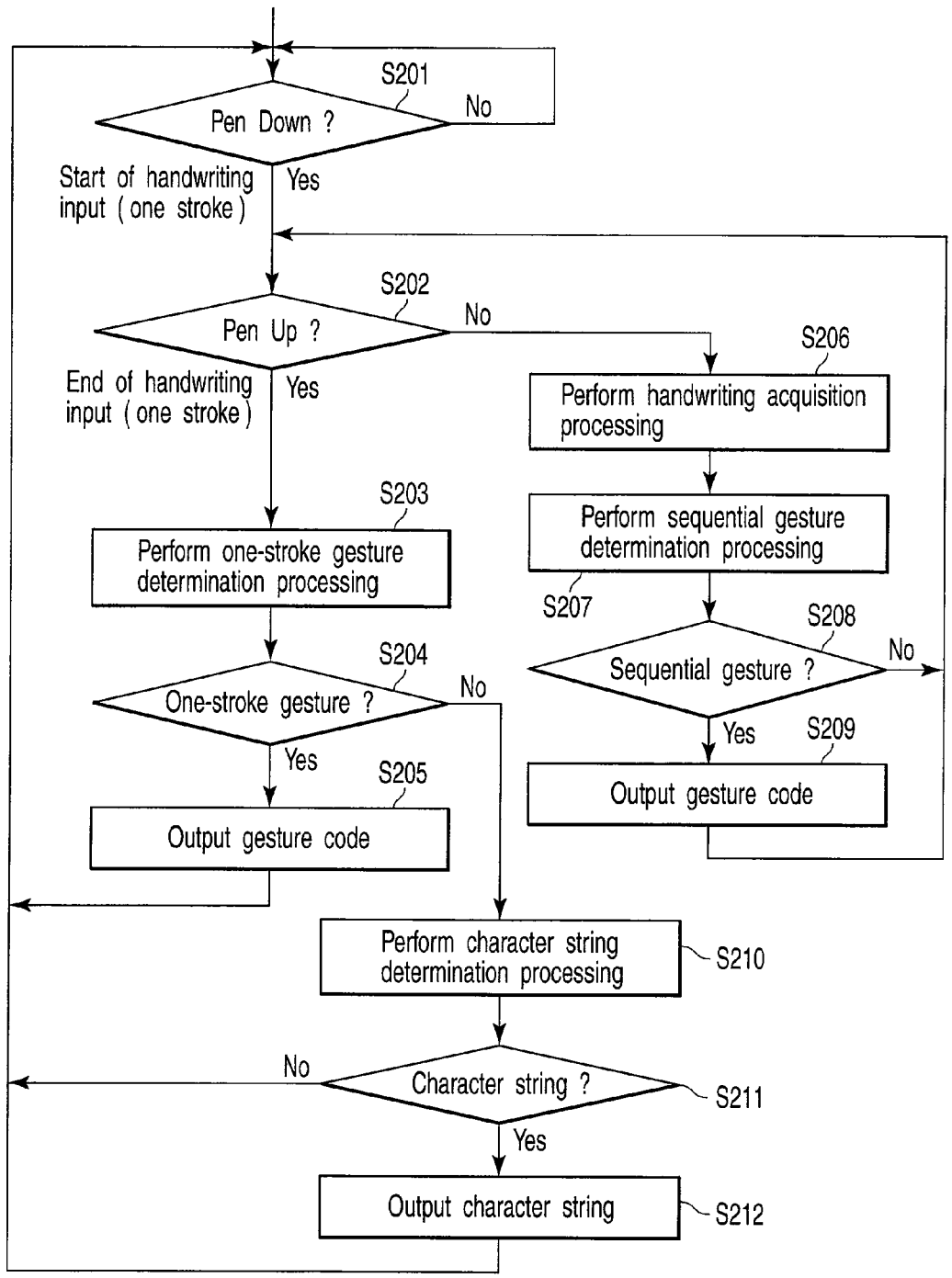
FIG. 2 is a flowchart showing an example of operation in FIG. 1.

A handwriting determination apparatus and method and a program according to an embodiment will be described below with reference to the views of the accompanying drawing.

The handwriting determination apparatus and method and the program according to this embodiment allow to input a gesture even during handwriting even in a character input mode, a one-stroke basis gesture input mode, or the like.

The handwriting determination apparatus of this embodiment combines one-stroke gesture determination processing and character string determination processing, which are performed upon completion of one-stroke handwriting input, with sequential gesture determination processing which is sequentially processed for every movement of a pen during an input operation (one sampling point is added) or at predetermined time intervals. Upon determining a sequential gesture by sequential gesture determination processing during handwriting, this apparatus executes command processing corresponding to the gesture even during handwriting. One-stroke handwriting refers to a continuous curve (including a straight line) which is handwritten from the instant an input means such as a pen or finger comes into contact with a handwriting input area to the instant the input means leaves the area.

The handwriting determination apparatus of this embodiment will be described with reference to FIG. 1.

The handwriting determination apparatus of this embodiment includes a handwriting input unit 101, character string determination unit 102, one-stroke gesture determination unit 103, sequential gesture determination unit 104, character string dictionary 105, one-stroke gesture dictionary 106, sequential gesture dictionary 107, handwriting display unit 108, and sound output unit 109. The same reference numerals as those of the components described above denote the same components, and a repetitive description will be omitted.

The handwriting input unit 101 accepts and acquires handwriting data which the user handwrites with, for example, a pen or finger, and temporarily stores it in a memory (not shown). The handwriting input unit 101 is, for example, a tablet which samples, at predetermined time intervals, two-dimensional coordinate data (handwriting data) representing the position of the tip of the pen while the pen is in contact with the tablet. Handwriting data can be expressed by the following time sequence:

(X[1], Y[1]), (X[2], Y[2]), . . . , (X[K], Y[K])

where X[i] and Y[i] are coordinates on a two-dimensional plane on a coordinate input device at time i, and represent the position of the tip of the pen or finger at predetermined time intervals.

The character string determination unit 102 acquires handwriting data input to the handwriting input unit 101 every time the input of a one-stroke handwriting is complete, and refers to the character string dictionary 105 by using the handwriting data input so far, thereby searching the dictionary for character string data corresponding to the acquired handwriting data. When searching out the corresponding character string data from the character string dictionary 105, the character string determination unit 102 plans to output the character string. The character string determination unit 102 determines, on the basis of the determination result obtained by another determination unit, whether to output the character string. This determination processing will be described with reference to a flowchart. Note that the character string determination unit 102 stores the handwriting data input so far in a memory or the like (not shown).

The character string dictionary 105 stores a plurality of character string data. Each character string data contains a character string and structure information indicating the structure of the character string. The structure information corresponds to handwriting data, and has information concerning a character comprising one or more strokes. The handwriting input unit 101 determines whether this structure information corresponds to the input handwriting data, and searches for character string data.

The one-stroke gesture determination unit 103 acquires handwriting data input to the handwriting input unit 101 every time the input of a one-stroke handwriting is complete, and refers to the one-stroke gesture dictionary 106, thereby searching for one-stroke gesture data corresponding to the acquired handwriting data from the dictionary. Each one-stroke gesture data contains a gesture code indicating a command issued in accordance with a gesture and handwriting data corresponding to one stroke of the gesture. In this case, a command is an instruction to be executed for a device to which the handwriting determination apparatus connects, and is, for example, an instruction generally input with a keyboard, mouse, or the like, e.g., "scroll", "page up", or "select". When searching out the corresponding command from the one-stroke gesture dictionary 106, the one-stroke gesture determination unit 103 plans to execute the command. The one-stroke gesture determination unit 103 determines, on the basis of the determination result obtained by another determination unit, whether to execute the command. This determination processing will be described later with reference to a flowchart. When executing a command, the one-stroke gesture determination unit 103 executes a command corresponding to a gesture code. Unlike this operation, a control unit (not shown) may receive a gesture code and execute a corresponding command. Note that one-stroke gesture data may contain a feature of handwriting data. This feature is a feature of a handwriting data which is input with a pen or the like and allows to discriminate the handwriting data from a printed character, and indicates specific structure information.

The one-stroke gesture dictionary 106 stores a plurality of one-stroke gesture data.

The sequential gesture determination unit 104 sequentially acquires handwriting data input to the handwriting input unit 101, and refers to the sequential gesture dictionary 107 by using one-stroke handwriting data handwritten up to this point of time, thereby searching out sequential gesture data corresponding to the acquired handwriting data from the dictionary. When searching out the corresponding command from the sequential gesture dictionary 107, the sequential gesture determination unit 104 plans to execute the command. The sequential gesture determination unit 104 determines, on the basis of the determination result obtained by another determination unit, whether to execute the command. This determination processing will be described later with reference to a flowchart. The sequential gesture determination unit 104 will be described later with reference to FIGS. 3, 4, and 5. The sequential gesture determination unit 104 acquires handwriting data at, for example, predetermined time intervals. This predetermined time is preferably set to be shorter than the time required for a general user to write one stroke.

The sequential gesture dictionary 107 stores a plurality of sequential gesture data. Each sequential gesture data contains a gesture code indicating a command issued in accordance with a gesture and a feature of the handwriting data of the gesture. This feature is a feature of a handwriting data which is input with a pen or the like and allows to discriminate the handwriting data from a printed character, and indicates specific structure information.

The handwriting display unit 108 displays the handwriting which the user handwrites with the handwriting input unit 101, displays the character determined by the character string determination unit 102, or displays a symbol indicating the gesture determined by the one-stroke gesture determination unit 103 or the sequential gesture determination unit 104.

The sound output unit 109 receives a determination result from the character string determination unit 102, one-stroke gesture determination unit 103, or the sequential gesture determination unit 104, and determines whether to output a sound. Upon determining to output a sound, the sound output unit 109 outputs the sound corresponding to the determination result. When the character string determination unit 102 determines a character, the sound output unit 109 reads aloud the determined character. If there is no character corresponding to the handwriting data, the sound output unit 109 outputs a beep sound. Assume that the one-stroke gesture determination unit 103 or the sequential gesture determination unit 104 determines a gesture. In this case, if a command corresponding to the gesture is to be executed, the sound output unit 109 generates a specific sound allowing the user to recognize the corresponding information.

An example of the operation of the handwriting determination apparatus in FIG. 1 will be described next with reference to FIG. 2.

The handwriting input unit 101 determines whether a pen or the like has come into contact with the handwriting input area of the tablet (step S201). If the handwriting input unit 101 determines that the pen has come into contact with the handwriting input area, the process advances to step S202. If the handwriting input unit 101 determines that the pen has not come into contact with the handwriting input area, the apparatus executes step S201 again after the lapse of the time for next sampling operation.

The handwriting input unit 101 then determines whether the pen or the like has left the handwriting input area (step S202). If the handwriting input unit 101 determines that the pen has left the handwriting input area, the process advances to step S203. If the handwriting input unit 101 determines that the pen has not left the handwriting input area, the process advances to step S206.

If the handwriting input unit 101 determines that the pen has left the handwriting input area, the one-stroke gesture determination unit 103 searches the one-stroke gesture dictionary 106 for one-stroke gesture data corresponding to the one-stroke handwriting data acquired by the handwriting input unit 101 (steps S203 and S204). If the one-stroke gesture dictionary 106 contains the corresponding one-stroke gesture data, the process advances to step S205. If the one-stroke gesture dictionary 106 does not contain the corresponding one-stroke gesture data, the process advances to step S210.

If the one-stroke gesture dictionary 106 contains the corresponding one-stroke gesture data, the one-stroke gesture determination unit 103 outputs a gesture code and executes a command corresponding to the gesture code (step S205). If the one-stroke gesture dictionary 106 does not contain the corresponding one-stroke gesture data, the character string determination unit 102 searches the character string dictionary 105 for character string data corresponding to the one-stroke handwriting data acquired by the handwriting input unit 101 (steps S210 and S211). If the character string dictionary 105 contains the corresponding character string data, the process advances to step S212. If the character string dictionary 105 does not contain the corresponding character string data, the process returns to step S201. If the character string dictionary 105 contains the corresponding character string data, the character string determination unit 102 outputs the character string to the handwriting display unit 108 (step S212).

Upon determining that the pen or the like has not left the handwriting input area, the handwriting input unit 101 continues to track the handwriting with the pen or the like (step S206). The sequential gesture determination unit 104 acquires the handwriting tracked in step S206, and searches the sequential gesture dictionary 107 for sequential gesture data corresponding to the handwriting (steps S207 and S208). If the sequential gesture dictionary 107 contains the corresponding sequential gesture data, the process advances to step S209. If the sequential gesture dictionary 107 does not contain the corresponding sequential gesture data, the process returns to step S202. If the sequential gesture dictionary 107 contains the corresponding sequential gesture data, the sequential gesture determination unit 104 outputs a gesture code, and a command corresponding to the gesture code is executed (step S209).

An example of the sequential gesture determined by the sequential gesture determination unit 104 in FIG. 1 will be described next with reference to FIGS. 3 and 4. The determination on the sequential gesture in FIG. 3 will be described with reference to FIG. 5.

Figure 3:
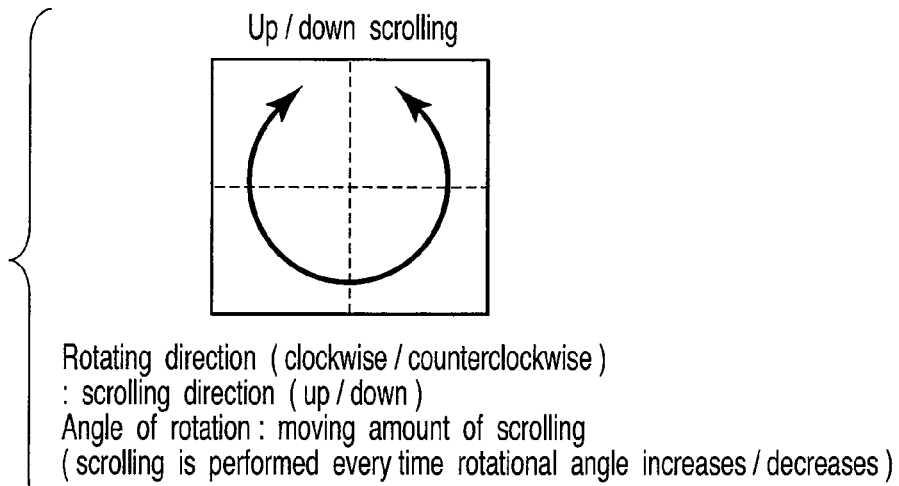
FIG. 3 is a view showing an example of a sequential gesture which a sequential gesture determination unit in FIG. 1 determines.
Figure 4:
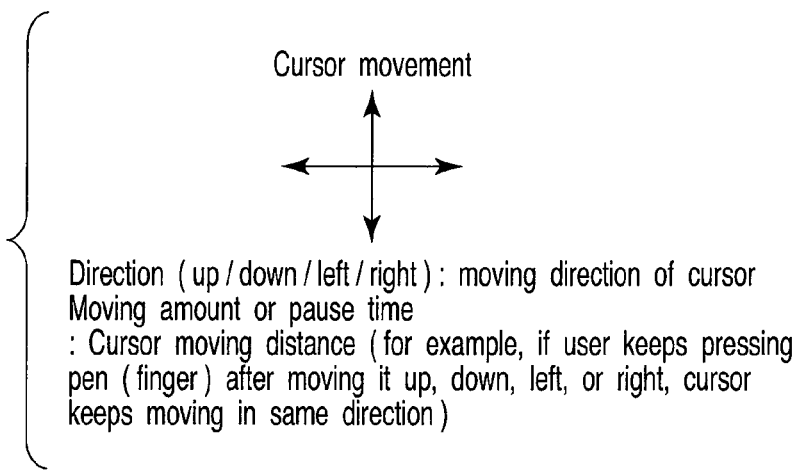
FIG. 4 is a view showing an example of a sequential gesture which the sequential gesture determination unit in FIG. 1 determines.
Figure 5:
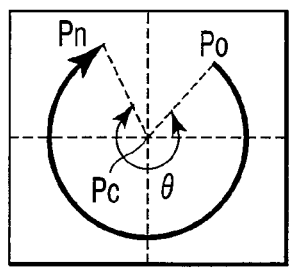
FIG. 5 is a view for explaining determination on a sequential gesture in FIG. 3.

FIGS. 3 and 4 each show the handwriting which the user inputs in the handwriting input area of the handwriting input unit 101 with a pen or the like. FIG. 3 shows an example of scrolling up and down on the display screen by drawing a circle in the handwriting input area with the pen. In the case shown in FIG. 3, the scrolling direction is upward or downward depending on whether the rotating direction of the circle is clockwise or counterclockwise, and the angle of the rotation corresponds to the moving amount of scrolling. Every time the rotational angle increases/decreases, scrolling is performed. FIG. 4 shows an example of moving a cursor up, down, left, and right by drawing straight lines in the handwriting input area with the pen. In the case shown in FIG. 5, the moving direction of the cursor is upward, downward, leftward, or rightward depending on whether the direction of a straight line is downward, upward, leftward, or rightward, and the moving distance of the tip of the pen corresponds to the moving distance of the cursor. With regard to the moving distance of the cursor, when the user moves the tip of the pen up, down, left, or right and keeps the tip of the pen in contact with the handwriting input area, it suffices to continuously move the cursor.

In the case of the sequential gesture in FIG. 3, the sequential gesture determination unit 104 performs the following operations:
1. setting the start point to Po at the time of pen-down.
2. calculating an angle θ of an arc from Po to a current position Pn of the tip of the pen.
3. determining a gesture when the angle θ exceeds a threshold, and replacing Pn with Po.
4. returning to 2.

In this case, a threshold for the angle θ is set such that if the angle θ exceeds the threshold, the sequential gesture dictionary 107 contains a command corresponding to the handwriting.

A manner of obtaining the angle θ of an arc will be described next. If the middle of the handwriting input area is a center Pc(Xc, Yc) of rotation, and the coordinates of Po and Pn are respectively represented by (Xo, Yo) and (Xn, Yn), since $$|Vo||Vn|\cos\theta = Vo \cdot Vn$$

holds, the sequential gesture determination unit 104 can calculate the angle θ. In this case, Vo is a vector from the center Pc to Po, and can be expressed by (Xo−Xc, Yo−Yc). In addition, Vn is a vector from the center Pc to Pn, and can be expressed by (Xn−Xc, Yn−Yc). |V| represents the absolute value of the vector. If $|V|=|(x, y)|$, then $(x^2+y^2)^{1/2}$. V1·V2 represents the inner product of vectors, and is given as $V1 \cdot V2 = (X1, Y1) \cdot (X2, Y2) = X1 \times X2 + Y1 \times Y2$.

Figure 6:
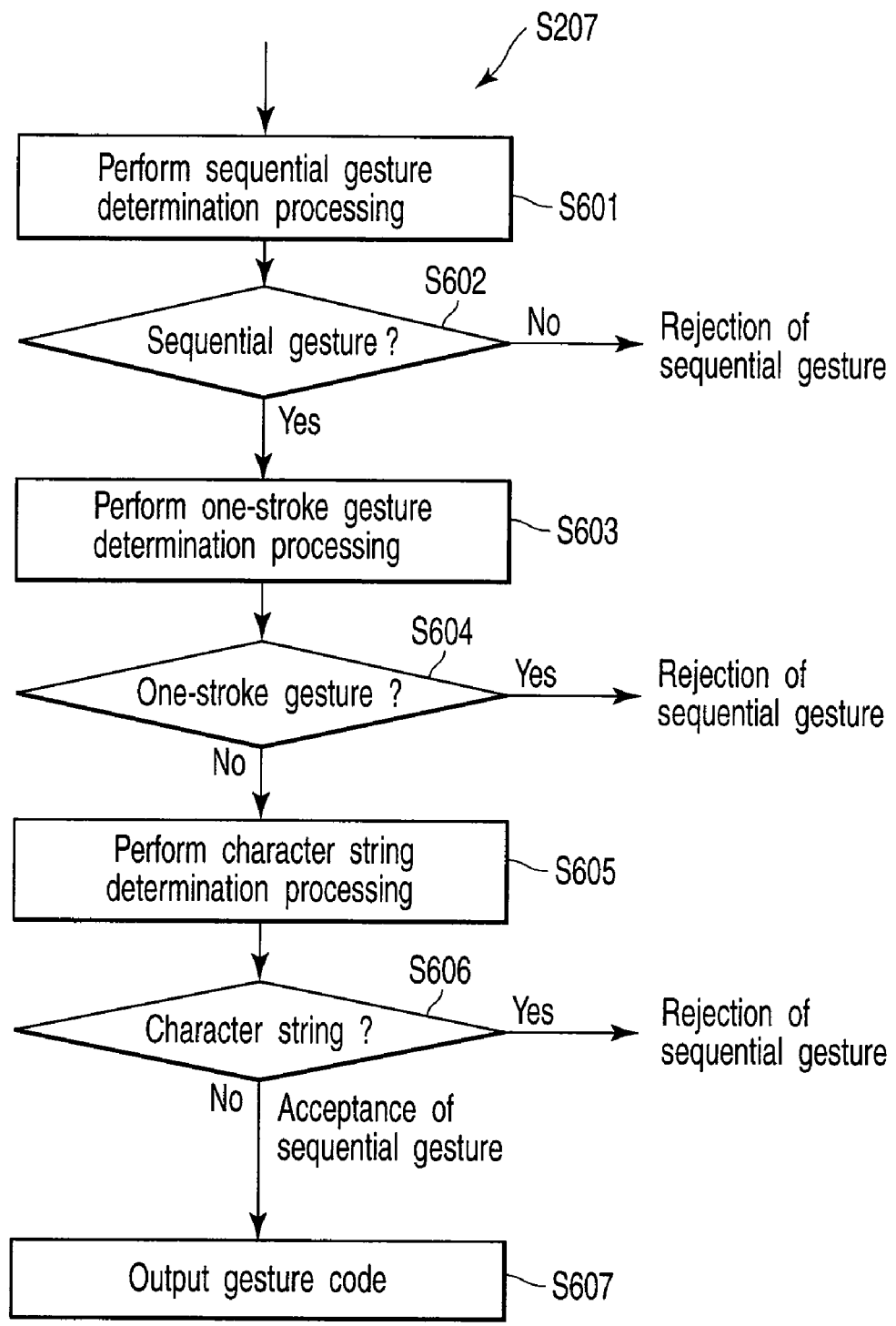
FIG. 6 is a flowchart showing an example of operation in step S207 in FIG. 2.

An example of operation for preventing a character string or a one-stroke gesture from being erroneously determined as a sequential gesture will be described next with reference to FIG. 6.

Assume that the character string determination unit 102 and the one-stroke gesture determination unit 103 have already been installed, and the sequential gesture determination unit 104 is added. In this case, the sequential gesture determination unit 104 may erroneously determine, as a sequential gesture, a character determined by the character string determination unit 102 or a one-stroke gesture to be determined by the one-stroke gesture determination unit 103 during an input operation. For example, the sequential gesture determination unit 104 may erroneously determine up and down scrolling as the letter "O". In order to minimize such determination errors, this apparatus additionally performs the processing of canceling an erroneously determined sequential gesture on the basis of the determination made by the character string determination unit 102 or the one-stroke gesture determination unit 103, even if the sequential gesture determination unit 104 erroneously determines such handwriting as a sequential gesture. FIG. 6 shows step S207 in FIG. 2.

The sequential gesture determination unit 104 acquires the handwriting tracked in step S206, and searches the sequential gesture dictionary 107 for sequential gesture data corresponding to the handwriting (steps S601 and S602). If the sequential gesture dictionary 107 contains the corresponding sequential gesture data, the process advances to step S603. If the sequential gesture dictionary 107 does not contain the corresponding sequential gesture, the sequential gesture determination unit 104 determines that this handwriting is not a sequential gesture, and rejects the determination about the sequential gesture.

If the sequential gesture dictionary 107 contains the corresponding sequential gesture data, the one-stroke gesture determination unit 103 searches the one-stroke gesture dictionary 106 for one-stroke gesture data corresponding to the one-stroke handwriting data acquired by the handwriting input unit 101 (steps S603 and S604). If the one-stroke gesture dictionary 106 contains the corresponding one-stroke gesture data, the one-stroke gesture determination unit 103 cancels the sequential gesture data determined in steps S601 and S602 and rejects the determination about the sequential gesture. The one-stroke gesture determination unit 103 then determines that this handwriting is a one-stroke gesture. If the one-stroke gesture dictionary 106 does not contain the corresponding one-stroke gesture data, the process advances to step S605.

If the one-stroke gesture dictionary 106 does not contain the corresponding one-stroke gesture data, the character string determination unit 102 searches the character string dictionary 105 for character string data corresponding to the one-stroke handwriting data acquired by the handwriting input unit 101 (steps S605 and S606). If the character string dictionary 105 contains the corresponding character string data, the character string determination unit 102 cancels the sequential gesture data determined in steps S601 and S602 and rejects the determination about the sequential gesture. The character string determination unit 102 then determines that this handwriting is a character string. If the character string dictionary 105 does not contain the corresponding character string data, the character string determination unit 102 determines that a sequential gesture corresponding to the sequential gesture data determined in steps S601 and S602 is based on this handwriting (accepts the determination about the sequential gesture). Thereafter, the gesture code corresponding to this sequential gesture is output (step S607).

The processing for preventing a handwriting determined as a gesture by the sequential gesture determination unit 104 from being redundantly determined as a character string or a gesture by the character string determination unit or the one-stroke gesture determination unit will be described with reference to FIG. 7. The same reference numerals denote the same steps as those described above, and a repetitive description will be omitted.

If it is determined in step S201 that the pen or the like has come into contact with the handwriting input area, sequential gesture flag=false which indicates that the handwriting is not determined as a sequential gesture is stored in a memory or the like (not shown). The process then advances to step S202. For example, the sequential gesture determination unit 104 has this memory.

If it is determined in step S202 that the pen or the like has left the handwriting input area, it is determined whether the sequential gesture flag is true (step S702). If the sequential gesture flag is true, the process returns to step S201 while this flag is held.

After the sequential gesture determination unit 104 outputs a gesture code in step S209, the flag is set to sequential gesture flag=true, and the process returns to step S202 (step S703).

Assume that a handwriting determined as a sequential gesture is found to be a character string or a one-stroke gesture after pen-up. The processing for canceling processing associated with a sequential gesture, which has already been performed in this case, will be described.

If, for example, a handwriting has been determined as a sequential gesture corresponding to cursor movement to the right, the user moves the cursor to the opposite direction, i.e., to the left, to cancel the operation.

Figure 8:
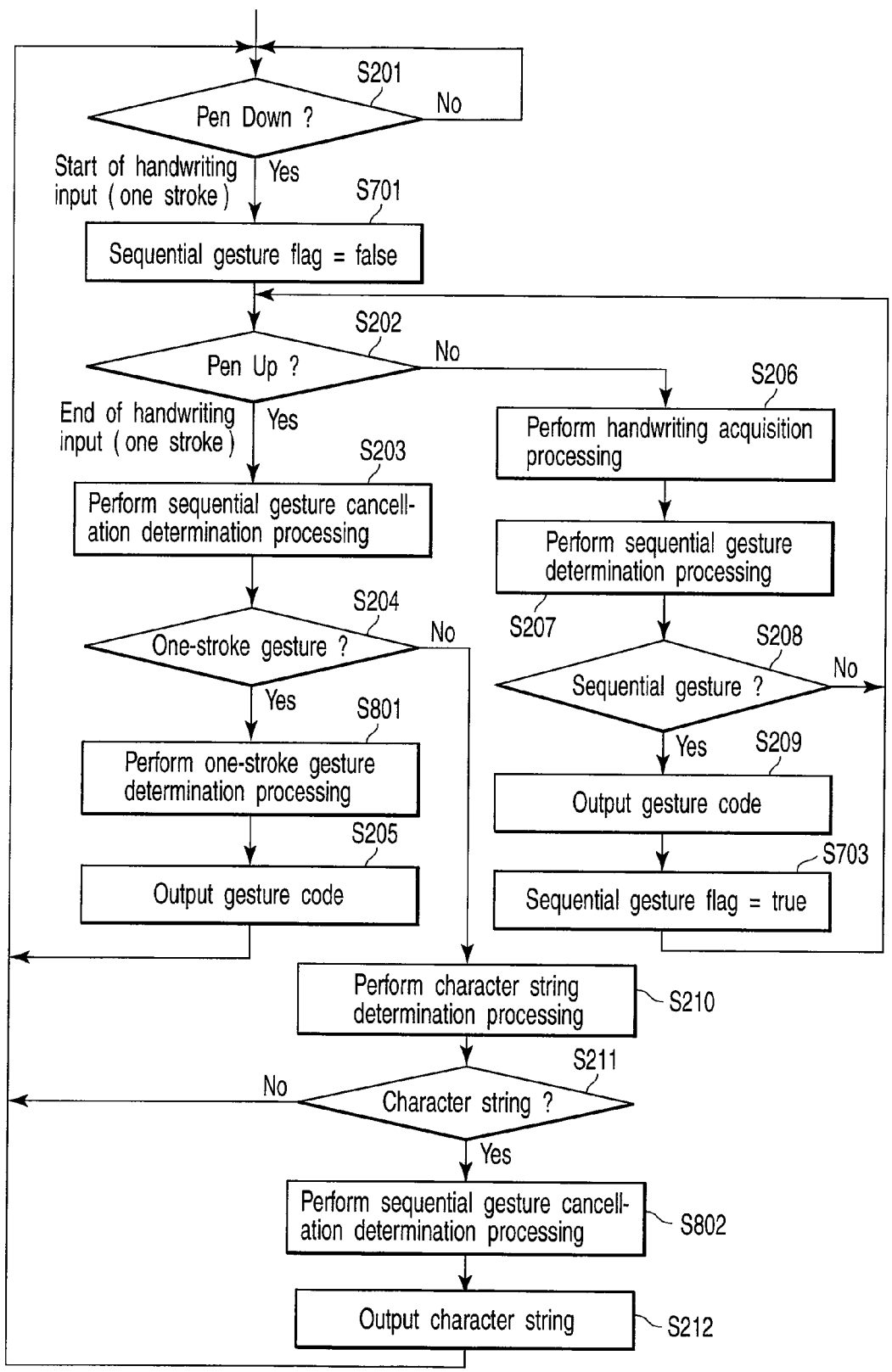
FIG. 8 is a flowchart showing an example of operation in FIG. 1.
Figure 9:
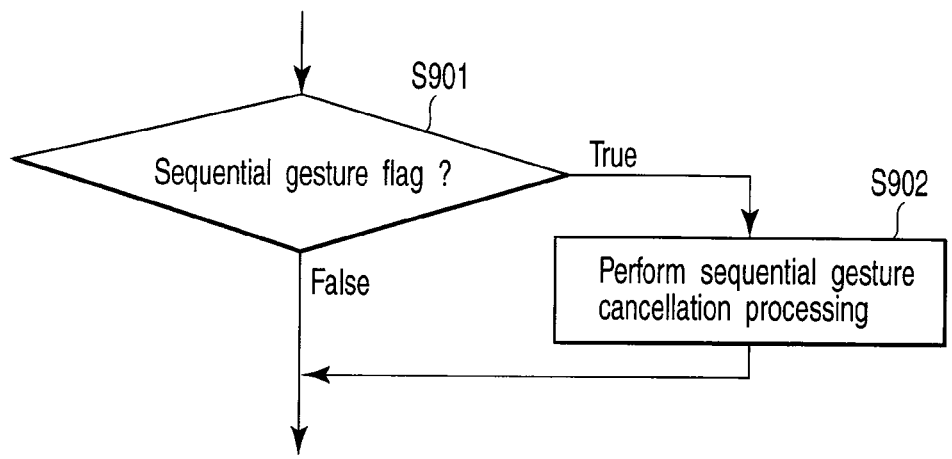
FIG. 9 is a flowchart showing an example of operation in steps S801 and S802 in FIG. 8.

An example of the operation of the handwriting determination apparatus shown in FIG. 1 in this processing will be described with reference to FIGS. 8 and 9.

If it is determined in step S204 that the one-stroke gesture dictionary 106 contains one-stroke gesture data corresponding to the one-stroke handwriting data acquired by the handwriting input unit 101, sequential gesture cancellation determination processing is performed. After this determination processing, the process advances to step S205. In the sequential gesture cancellation determination processing, it is determined whether the sequential gesture flag is true or false. If the flag is true, the sequential gesture is canceled. An example of this operation will be described later with reference to FIG. 9.

In addition, when the character string determination unit 102 determines in step S211 that the character string dictionary 105 contains character string data corresponding to the one-stroke handwriting data acquired by the handwriting input unit 101, sequential gesture cancellation determination processing is performed. After this determination processing, the process advances to step S212.

Sequential gesture cancellation determination processing will be described with reference to FIG. 9.

The sequential gesture determination unit 104 determines whether the sequential gesture flag is true or false. If the flag is true, the sequential gesture determination unit 104 performs the processing of canceling a sequential gesture corresponding to this sequential gesture flag. This cancellation processing makes the sequential gesture flag false. If the sequential gesture flag is false or sequential gesture cancellation processing has already been performed, the process advances to the next step.

Figure 10:
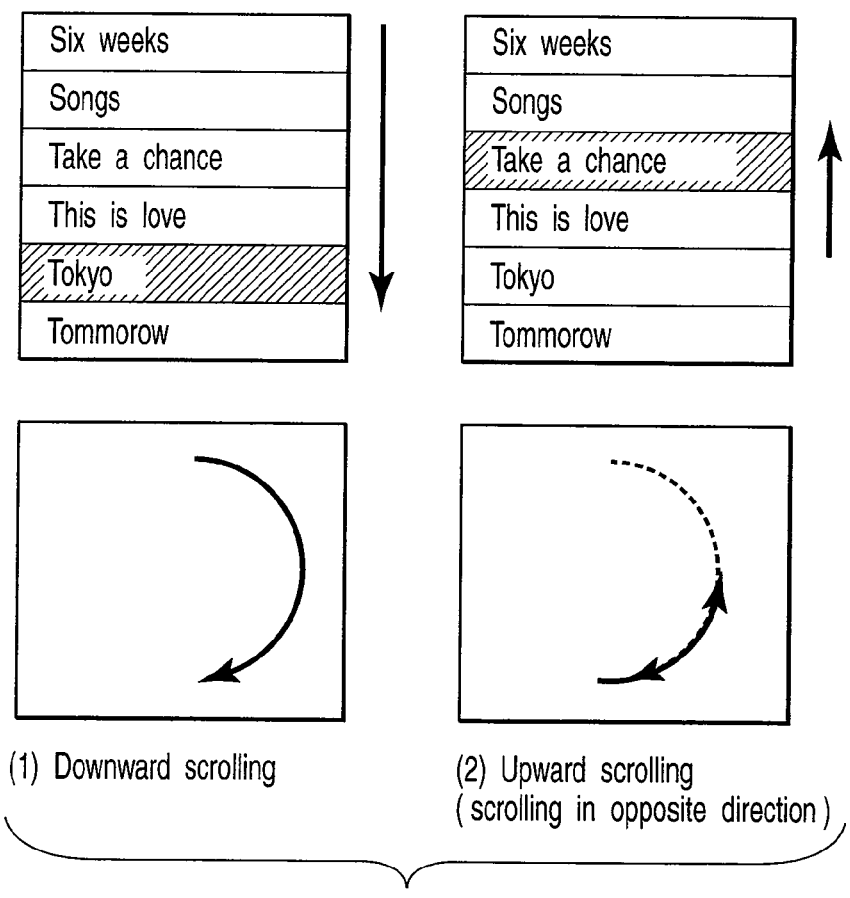
FIG. 10 is a view for explaining the processing of continuously inputting a sequential gesture.

The processing for continuously inputting sequential gestures will be described next with reference to FIG. 10. This processing allows to continuously input a plurality of types of gestures without pen-up. If, for example, the scrolling position exceeds a target position, the scrolling position can be smoothly returned in the opposite direction. Referring to FIG. 8, when the scrolling position exceeds "Take a chance" as a target position after scrolling downward from "Six weeks" ("(1)" in FIG. 10), the scrolling position can be smoothly returned to the target position by scrolling in the opposite direction without pen-up ("(2)" in FIG. 10).

It suffices to perform the display processing of causing the sound output unit 109 to output a sound to the user or causing the handwriting display unit 108 to change handwriting display in order to notify the user that the handwriting input by the sequential gesture determination unit 104 is determined as a gesture. According to "(2)" in FIG. 10, for example, the clockwise trace in "(1)" in FIG. 10 is erased, and only the counterclockwise trace in "(2)" in FIG. 10 is displayed. Assume that the sound output unit 109 is to output a sound to the user. In this case, if the character string determination unit 102 and the one-stroke gesture determination unit 103 perform determination as well as the sequential gesture determination unit 104, it suffices to change the type of sound and output the sound depending on the determination unit which has performed determination.

Figure 11:
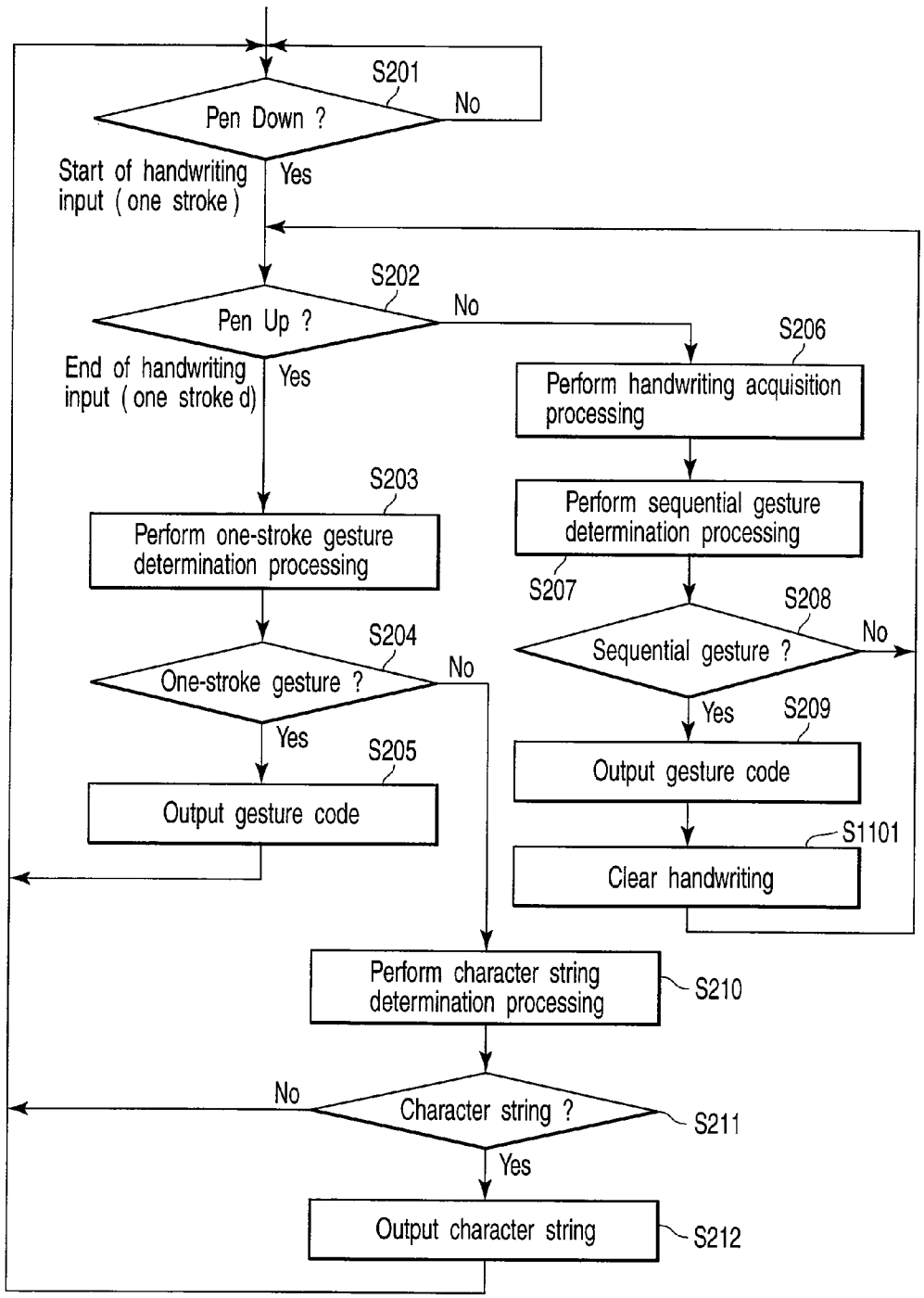
FIG. 11 is a flowchart showing an example of operation in the processing in FIG. 10.

An example of the operation of the handwriting determination apparatus for performing the processing described with reference to FIG. 10 will be described with reference to FIG. 11.

In step S209, if the handwriting tracked in step S209 is acquired and the sequential gesture dictionary 107 contains sequential gesture data corresponding to this handwriting, the sequential gesture determination unit 104 outputs a gesture code. After the execution of a command corresponding to the gesture code, the handwriting data stored in the memory of the handwriting input unit 101 is erased (step S1101). After the processing in step S1101, the process returns to step S202.

Figure 7:
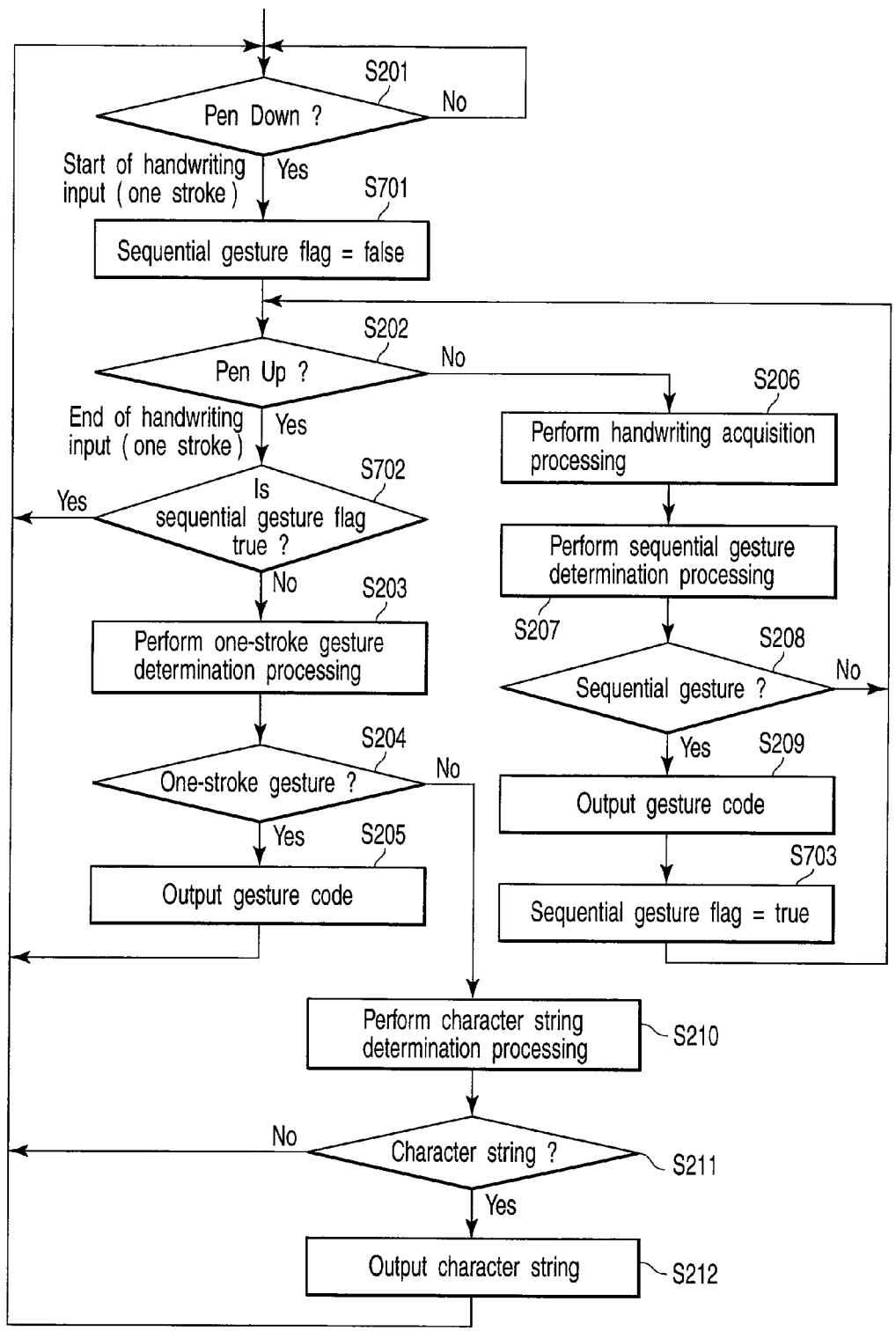
FIG. 7 is a flowchart showing an example of operation in FIG. 1.
Figure 12:
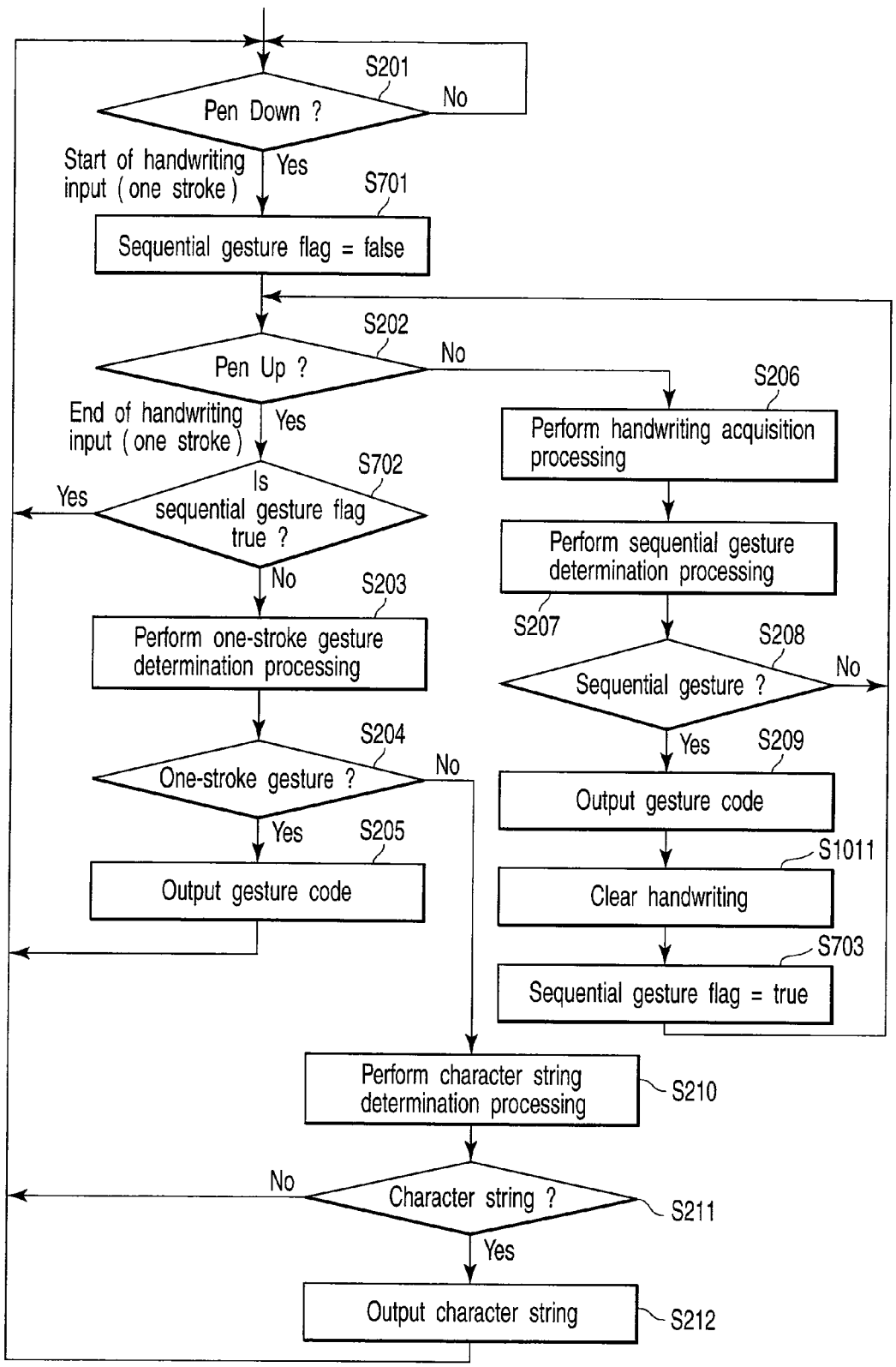
FIG. 12 is a flowchart showing an example of operation in the processing in FIG. 10.

In the case shown in FIG. 7 in which the memory stores the sequential gesture flag, the handwriting determination apparatus performs processing in accordance with, for example, the flowchart shown in FIG. 12. The only difference from the above case is that the process shifts to the processing in step S703 after the execution of the processing in step S1101.

Determination modes in character string determination processing, one-stroke gesture determination processing, and sequential gesture determination processing will be described next with reference to FIG. 13.

The determination mode in character string processing indicates, for example, the operation of switching recognition target character types (character types which can be determined, e.g., the hiragana mode, katakana mode, numeral mode, and Western alphabet mode). The determination modes in sequential gesture determination processing and sequential gesture determination processing indicate, for example, the operation of switching gesture types which can be determined. For example, as shown in FIG. 13, mode switching is effective in searching for a program name, song title, or the like. For example, it suffices to determine a tap gesture ("(4)" in FIG. 13) depending on whether both "1" and "2" are satisfied:

1. A handwriting from pen-down to pen-up falls within a predetermined area.
2. The time from pen-down to pen-up falls within a predetermined time.

Figure 13:
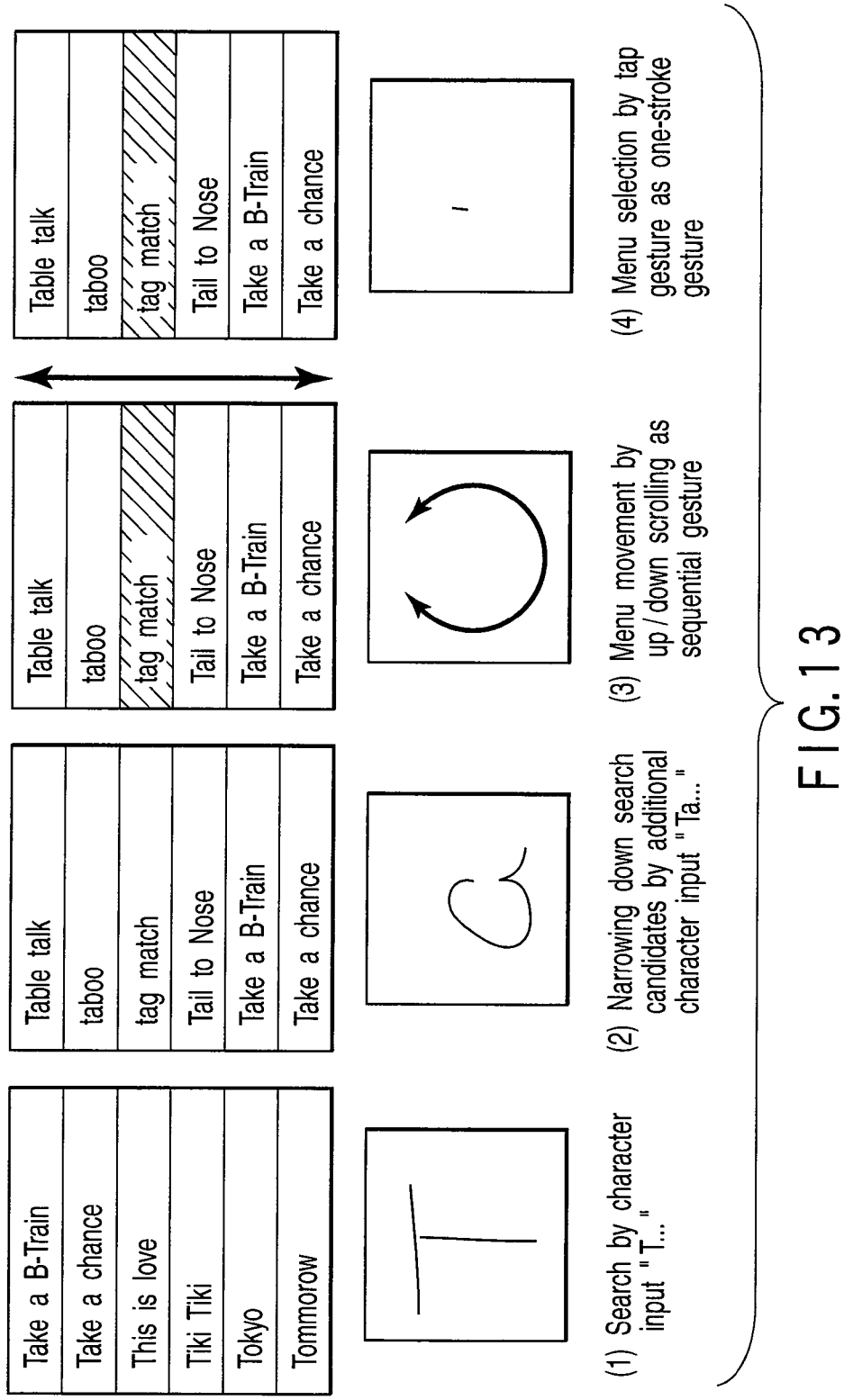
FIG. 13 is view for explaining a determination mode in determination processing.

Referring to FIG. 13, when the operation shifts from "(3)" to "(4)", the determination modes in the character string determination unit 102 and one-stroke gesture determination unit 103 are switched. That is, in the character string determination unit 102, the state wherein a character can be determined is switched to the state wherein a character cannot be determined. In the one-stroke gesture determination unit 103, the state wherein a tap gesture cannot be determined is switched to the state wherein a tap gesture can be determined.

In the example shown in FIG. 13, although no mode switching is performed from "(1)" to "(3)", mode switching is performed only when the operation shifts from "(3)" to "(4)". That is, mode switching is performed only after a sequential gesture. The sequential gesture determination unit 104 or a control unit (not show) may perform mode switching.

Figure 14:
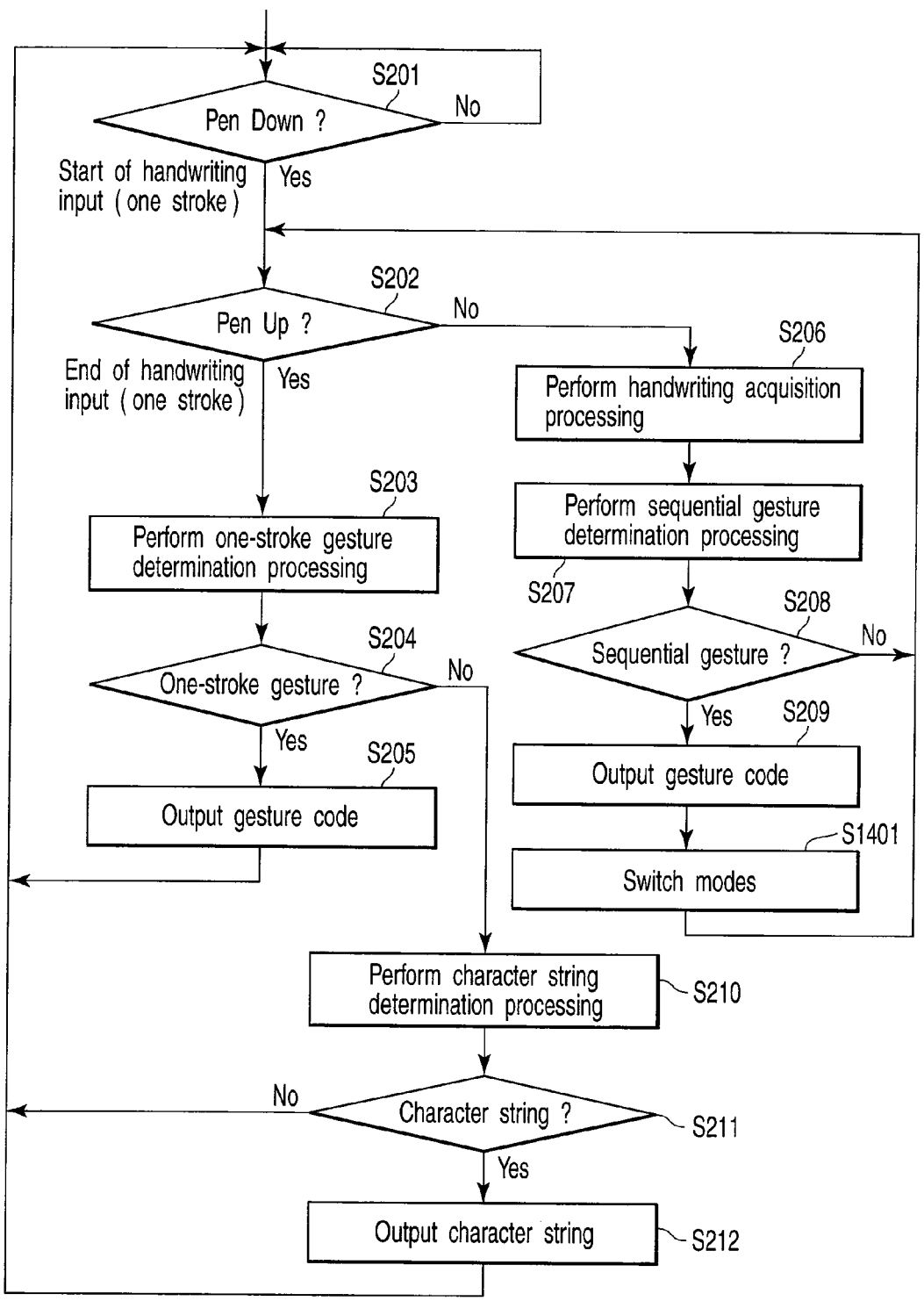
FIG. 14 is a flowchart showing an example of operation in the processing in FIG. 13.

An example of the operation of the handwriting determination apparatus for performing the processing described with reference to FIG. 13 will be described with reference to FIG. 14.

In step S209, if the handwriting tracked in step S206 is acquired and the sequential gesture dictionary 107 contains sequential gesture data corresponding to this handwriting, the sequential gesture determination unit 104 outputs a gesture code. After the execution of a command corresponding to the gesture code, for example, the sequential gesture determination unit 104 performs a mode switching operation (step S1401). After the processing in step S1401, the process returns to step S202.

According to the above embodiment, it is possible to input a gesture even during a handwriting operation even in the character input mode, the one-stroke basis gesture input mode, or the like. For example, it is possible to input a gesture even during a handwriting operation, as well as a character or one-stroke basis gesture, in the same mode as that for character input. The user can proceed with a sequential gesture input operation while checking a determination result. For example, when moving the cursor, the user may input a gesture while actually checking the movement of the cursor, and finish gesture input when the cursor reaches a desired position. This makes it possible to implement a user interface easier to use than the prior art. With regard to a sequential gesture, it is possible to continuously input the same gesture while continuing a handwriting input operation or change to another gesture. Consider, for example, cursor movement. Even if the cursor position exceeds a target position during gesture input operation, it is possible to easily return the cursor position by changing the direction of cursor movement for a gesture to the opposite direction.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A handwriting determination apparatus comprising:
a handwriting input unit configured to acquire first handwriting data written by a user;
a sequential gesture dictionary configured to store second handwriting data corresponding to a time from pen down to pen up and store a first command corresponding to the second handwriting data and executed with a device to which the apparatus is connected, the pen down and the pen up being performed by a user's pen or a user's finger;
a sequential gesture determination unit configured to sequentially acquire third handwriting data corresponding to from a time of pen down to a time before pen up and sequentially search the sequential gesture dictionary for a second command corresponding to the third handwriting data;
the sequential gesture determination unit configured to, when the second command is searched out from the sequential gesture dictionary, execute the second command;
a character string dictionary configured to store one-stroke handwriting data corresponding to not less than one stroke and store a command which is made to correspond to the one-stroke handwriting data, the one-stroke handwriting data corresponding to a time from pen down to pen up;
a character string determination unit configured to search the character string dictionary for a character string corresponding to the first, second, and third handwriting data, when the character string determination unit acquires the one-stroke handwriting data; and
the sequential gesture determination unit configured to output the character string, when the character string is searched out from the character string dictionary.

2. The apparatus according to claim 1, wherein when the first command is searched out from the sequential gesture dictionary, the character string determination unit regards a handwriting handwritten so far as one stroke, and searches the character string dictionary for the character string corresponding to the one-stroke handwriting data corresponding to the one stroke, and when the character string is searched out, the sequential gesture determination unit cancels the second command.

3. The apparatus according to claim 1, wherein when the first command is searched out from the sequential gesture dictionary, the character string determination unit stops operation afterward.

4. The apparatus according to claim 1, wherein when the sequential gesture determination unit plans to execute the second command, the sequential gesture determination unit searches for a command concerning a handwriting from which the first handwriting data is being continuously acquired.

5. A non-transitory computer readable storage medium storing instructions of a computer program which when executed by a computer results in performance of steps comprising:
acquiring first handwriting data written by a user;
preparing a sequential gesture dictionary configured to store second handwriting data corresponding to a time from pen down to pen up and store a first command corresponding to the second handwriting data and executed with a device to which the apparatus is connected, the pen down and the pen up being performed by a user's pen or a user's finger;
sequentially acquiring third handwriting data corresponding from a time of pen down to a time before pen up;
sequentially searching the sequential gesture dictionary for a second command corresponding to the third handwriting data;
planning to execute the second command , when the second command is searched out from the sequential gesture dictionary;
preparing a character string dictionary configured to store one-stroke handwriting data corresponding to not less than one stroke and store a command which is made to correspond to the one-stroke handwriting data, the one-stroke handwriting data corresponding to a time from pen down to pen up;
searching the character string dictionary for a character string corresponding to the first, second, and third handwriting data acquired so far, when the acquisition unit acquires the one-stroke handwriting data; and
outputting the character string, when the character string is searched out from the character string dictionary.

* * * * *